May 28, 1935.  H. Q. MUNN  2,003,263
ADJUSTABLE WORK CARRYING TABLE
Filed March 25, 1931    5 Sheets-Sheet 1
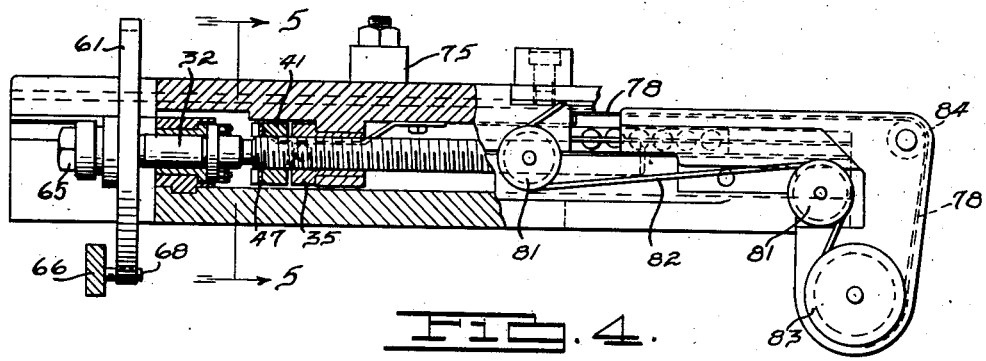
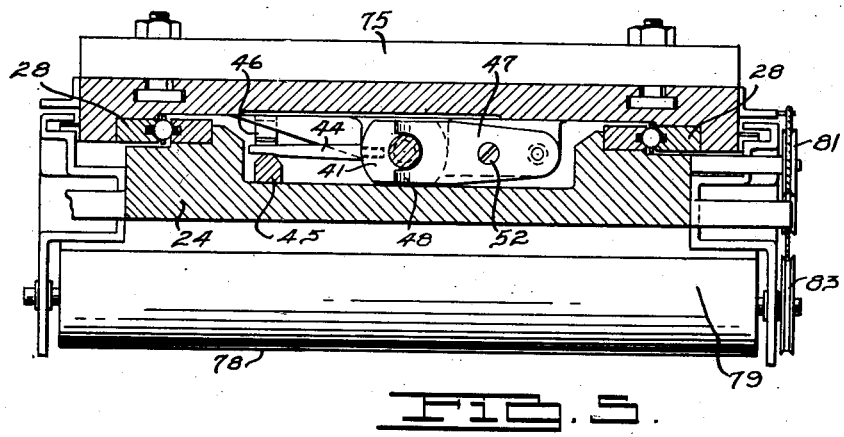
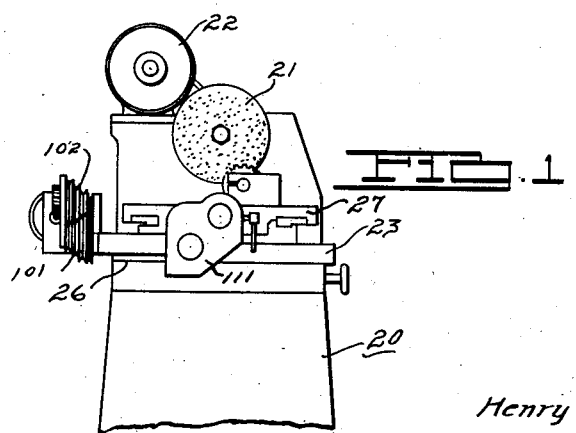
INVENTOR
Henry Quintin Munn.
BY
Harness, Dickey, Pierce & Hann.
ATTORNEYS.

May 28, 1935.     H. Q. MUNN     2,003,263
ADJUSTABLE WORK CARRYING TABLE
Filed March 25, 1931    5 Sheets-Sheet 2
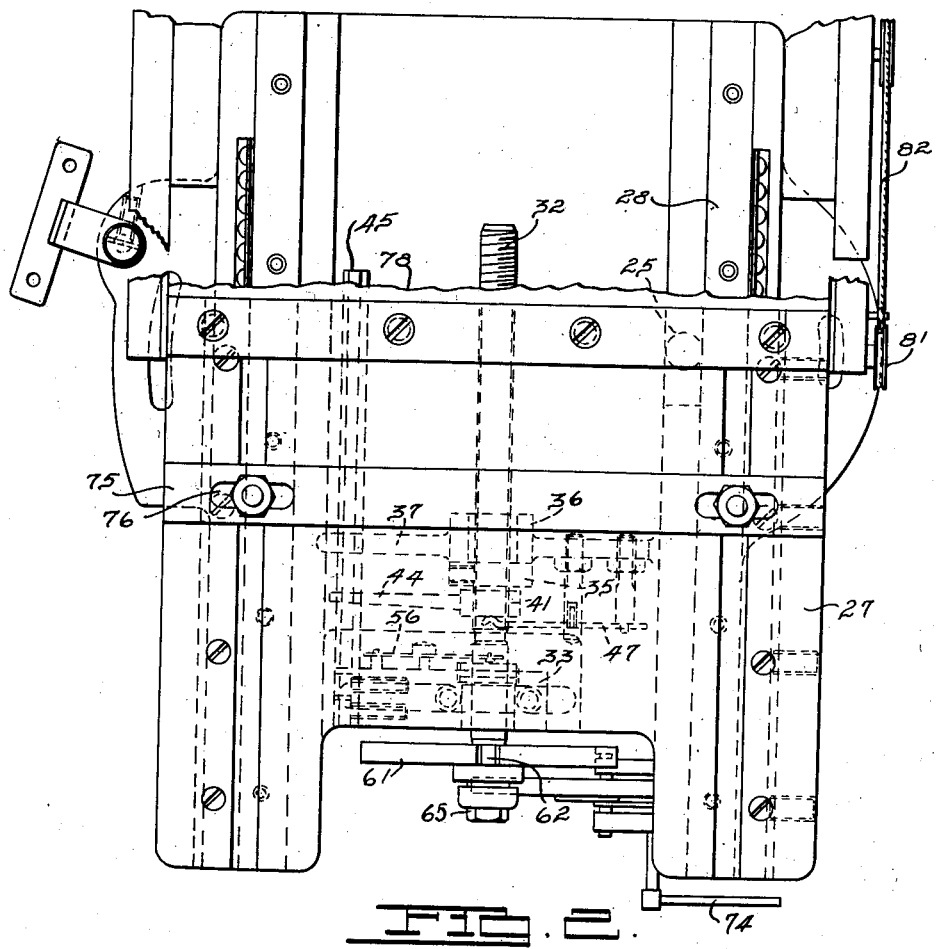
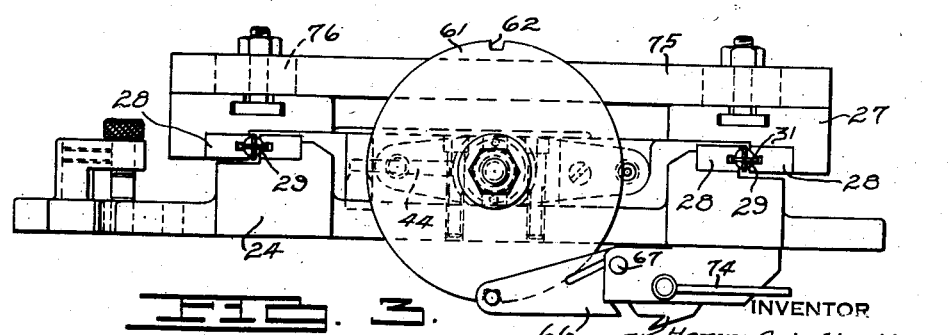
INVENTOR
Henry Quintin Munn.
BY
ATTORNEYS.

May 28, 1935.  H. Q. MUNN  2,003,263
ADJUSTABLE WORK CARRYING TABLE
Filed March 25, 1931  5 Sheets-Sheet 3
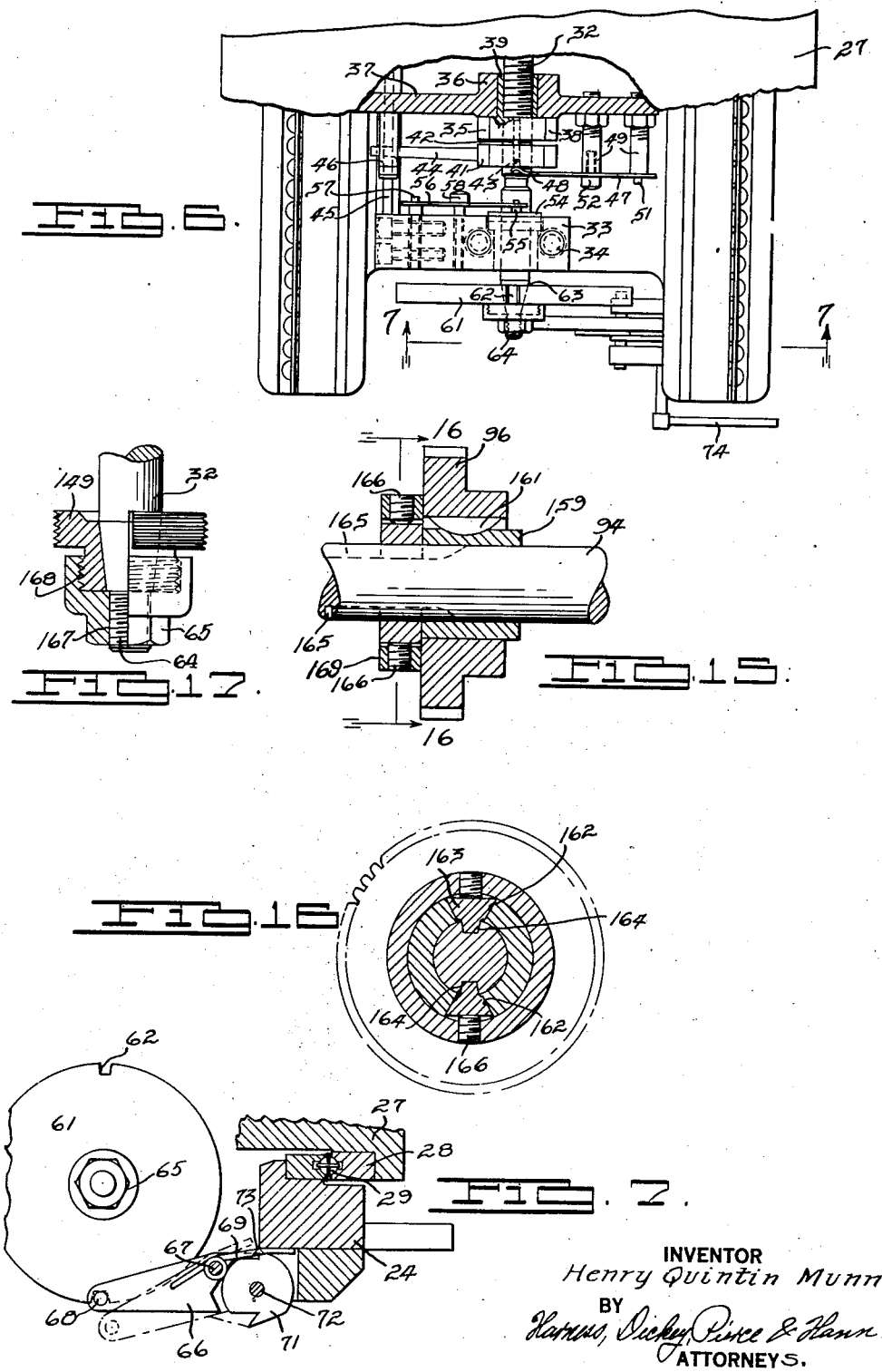
INVENTOR
Henry Quintin Munn.
BY
ATTORNEYS.

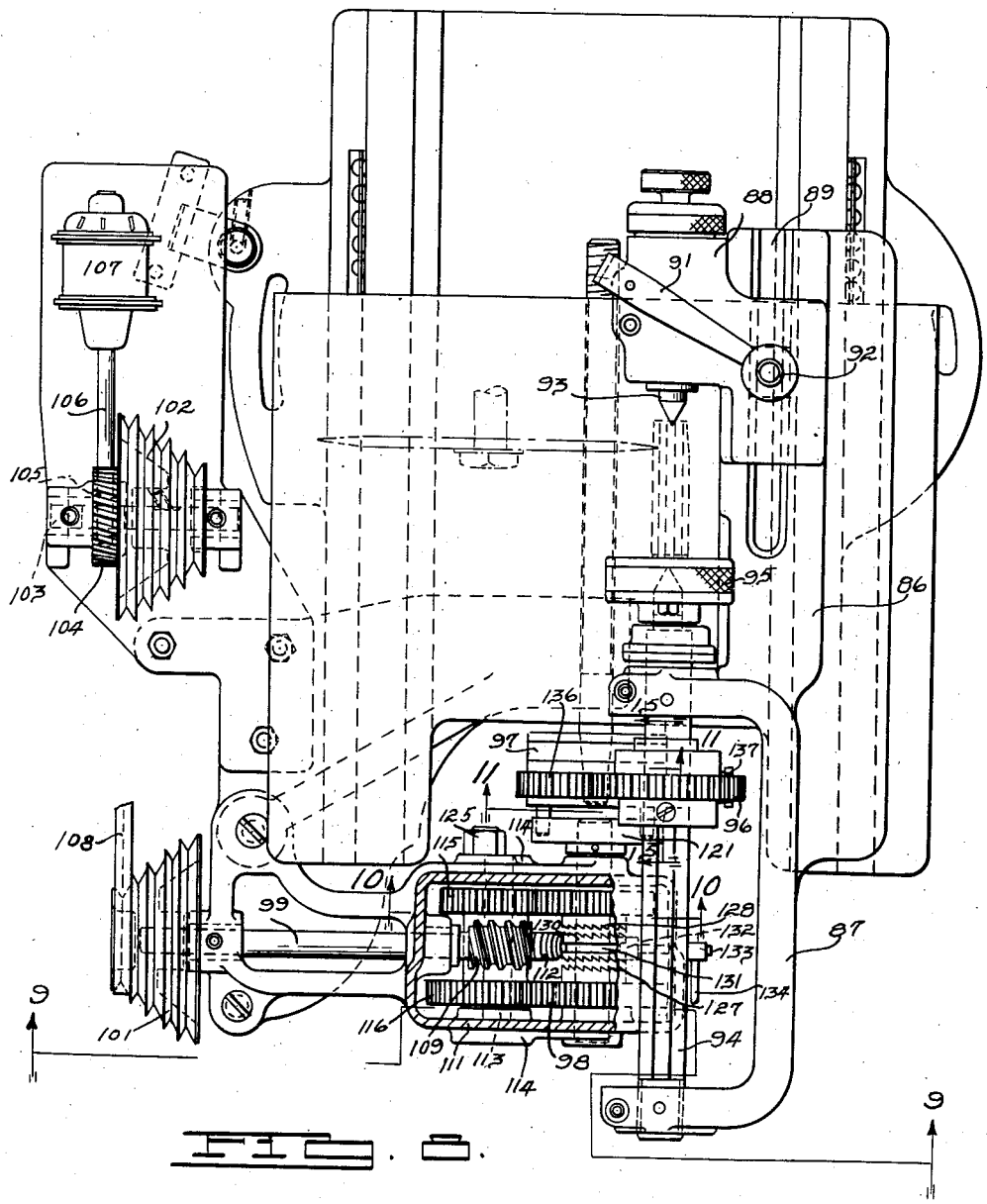

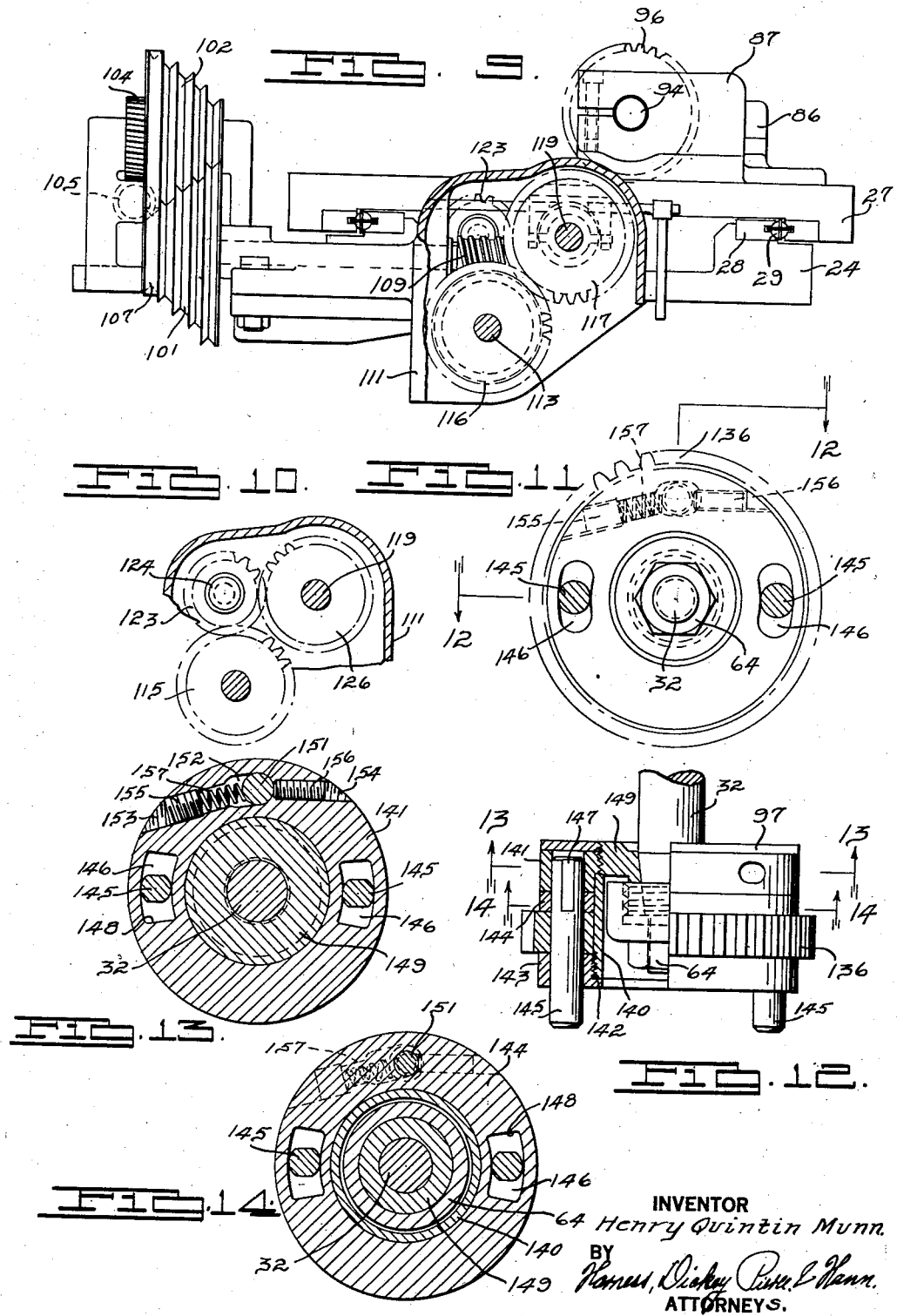

Patented May 28, 1935

2,003,263

UNITED STATES PATENT OFFICE 2,003,263

ADJUSTABLE WORK CARRYING TABLE

Henry Quintin Munn, Walkerville, Ontario, Canada, assignor to Michigan Tool Company, a corporation of Michigan Application March 25, 1931, Serial No. 525,221

5 Claims. (Cl. 51—95)

My invention relates to precision indexing machines and particularly to a work carrying table which is provided with interchangeable driving means whereby it may be moved a predetermined amount at intervals or caused to travel at a predetermined speed relative to a cutting member, the amount of movement being variable and adjustable.

Difficulty has been experienced in the past, when employing a lead screw for driving a work carrying table, in moving the table in opposite directions in such manner as to retain all points of the work piece in predetermined relation to a cutting element during both directions of movement. The driving means for the table and the support for the lead screw had lost motion or back lash therebetween which prevented the positioning of the table relative to the cutting element when the direction of movement of the table was changed. Accordingly when a thread was cut on a member, it has been the practice to machine the member in one direction only and the reciprocation of the machine to its original position was effected without a machining operation.

In practicing my invention, I eliminate the back lash from between the driving member and the table in order that it may be operated in either direction and be retained in predetermined relation to a cutting element in either direction of movement. When the work piece is to be rotated relative to the movement of the table I provide a compensating member between the driving member for the lead screw and that for effecting the rotation of the work piece, which prevents the movement of the table until the play in the work rotating mechanism is taken up. In this construction, the driving of the table and the work piece will be effected in such manner that the work piece and the table are always relative to each other and the cutting tool, in either direction of motion of the table.

Accordingly one object of my invention is to provide mechanism for a table which supports a work piece, that shall effect the movement of the table and the rotation of the work piece in such manner that the movements are relative to each other and to a cutting tool, in either direction of movement of the table.

Another object of my invention, is to provide a compensating device in conjunction with the work supporting table in such manner as to produce uniform rectilinear motion of the table in relation to uniform rotational motion of the work in one case; or to produce equal movements of the table for integral turns of the lead screw in another case.

A further object of my invention is to provide a supporting member for a lead screw for driving a work table longitudinally of a cutting tool, which shall be capable of supporting interchangeable lead screws of greater or lesser pitch for regulating the travel of the table relative to the cutting tool.

A further object of my invention is to provide an indexing head for the lead screw of the table of the above described type, which shall be effective for moving the table a predetermined amount at intervals during the machining of the work piece.

A still further object of my invention is to provide a table of the above described type with an adjustable work support which shall permit the lead screw to be positioned in angular relation to the line of motion imparted to the work and table as a whole, during machining of a thread on a plane surface, in such manner that the intervals between consecutive threads shall be equal to one another, but less by a predetermined amount than the pitch—or multiple of the pitch—of the lead screw; the intervals being effected by an integral number of turns of the lead screw.

A still further object of my invention is to provide a work table of the above described type, in which the indexing head may be interchanged for a continuous driving mechanism which is provided with back lash removing and compensating means referred to hereinabove.

Numerous other objects and features of novelty of my invention will be either specifically pointed out or will become apparent when referring, for a better understanding of my invention, to the following descriptions in conjunction with the accompanying drawings, wherein:

Figure 1 is a broken elevational view of a machine provided with a table and work rotating device for grinding cylindrical threads which embody features of my invention, Figure 2 is a plan view of an indexing table, for grinding threads on flat work pieces, which embodies additional features of my invention, Figure 3 is an elevational view of the structure shown in Figure 2, Figure 4 is a broken side view, partly in section and partly in elevation, of the structure shown in Figure 2, Figure 5 is a sectional view of the structure shown in Figure 4 taken along the line 5—5 thereof, Figure 6 is a broken reduced view, partly in section, of the structure shown in Figure 2, Figure 7 is a sectional view of the structure shown in Figure 6 taken along the line 7—7 thereof, Figure 8 is a plan view of the table shown in Figure 2 with a driving mechanism substituted for the indexing plate thereof, Figure 9 is an enlarged broken sectional view of the structure shown in Figure 8, taken along the line 9—9 thereof, Figure 10 is a broken sectional view of the structure shown in Figure 8, taken along the line 10—10 thereof, Figure 11 is an enlarged sectional view of the structure shown in Figure 8, taken along the line 11—11 thereof, Figure 12 is a sectional view of the structure shown in Figure 11, taken along the line 12—12 thereof, Figure 13 is a sectional view of the structure shown in Figure 12, taken along the line 13—13 thereof, Figure 14 is a sectional view of the structure shown in Figure 12, taken along the line 14—14 thereof, Figure 15 is an enlarged sectional view of the structure shown in Figure 8, taken along the line 15—15 thereof, Figure 16 is a sectional view of the structure shown in Figure 15, taken along the line 16—16 thereof, and Figure 17 is a view of the structure shown in Figure 12, with the clamping nut for the shaft, shown in section.

My invention comprises in general a machine 20 having a rotatable machining element 21, herein shown as an abrading member, which is driven by suitable driving means 22 which may be regulated to rotate the element 21 at a variable number of speeds. A work carrying mechanism 23 is mounted on the machine 20 for the purpose of moving a work piece, relative to the machining element 21, a predetermined amount each time the work supporting table is indexed or of moving the work piece laterally across the edge of the elements 21, to have the element engage the work piece at spaced continuous points thereof in the nature of a helix or a screw thread.

Referring to Figures 4 to 7 inclusive, I have illustrated the mechanism 23 as comprising a base plate 24 which is mounted for angular movement about a pin 25 relative to a flat surface 26 of the machine. A work supporting table 27 is mounted for longitudinal movement on the plate 24, by races 28 between which a row of ball bearings 29 are provided and retained in predetermined relation to each other by a cage 31. Relative movement is effected between the base plate 24 and the table 27 by a lead screw 32 which is supported on the plate 24 by a collar 33 and supporting bolts 34. A nut 35 is screwed on the lead screw 32 and retained in a boss 36 of a web 37 provided on the underside of the table 27 for the purpose of moving the table relative to the lead screw.

The nut 35 is made of two parts, the inner part 38 being provided with a reduced portion 39 which fits snugly within the boss 36 and which is movable outwardly, frontward thereof. A second part 41 is provided frontwardly of the part 38 and is connected thereto by a pair of pins 42, one end of which is fixed in the part 38, the other end of which is slidable in apertures 43 provided in the part 41. An arm 44 projects from the part 41 and extends laterally of the lead screw 32 and rests upon a sloping bar 45 against which it is retained by a spring 46 for a purpose which will be described more fully hereinafter.

A flat spring 47 is provided with a pair of arms 48 which span the lead screw 32 and is retained in biased relation with the outer surface of the part 41 of the nut, by the studs 49 which are mounted on the web 37 of the table. The outermost stud 49 is provided with a projection 51 which extends through the outer end of the spring 47, while the inner stud 49 is provided with a screw 52 for retaining the spring 47 on the studs.

The bias effected by the arms 48, forces the threads of the outer part 41 of the nut 35, against the outer surface of the thread, while the inner surface of the threads of the part 38 is drawn against the inner surface of the threads of the screw. In this manner the threads between the two parts of the nut and that on the lead screw are always retained in predetermined biased position to each other during either movement of the screw 32 and no back lash will be present between the lead screw and the driving means for the table.

To eliminate the back lash from the supporting end of the lead screw 32, the lead screw is provided with a collar 54 against which a pair of bearings 55 are biased by a bifurcated spring 56 which is retained on a projection 57 by a screw 58 in a manner similar to the mounting of the spring 47 on the web 37. The bias of the bearings 55 against the shoulder 54, retains the lead screw 32 in frontwardly position relative to the collar 33 and prevents the screw from moving longitudinally relative to the collar, when rotated. By eliminating the back lash from both the supporting and the driving means associated with the lead screw, the lead screw may be reversed at any point in its travel and still have the work retained in predetermined relation to the threads of the screw.

It will be noted that the collar 33 for supporting the lead screw is mounted by two machine screws 34 and that the nut 35 is retained in fixed relation with the hub 36 by the spring 47, and that the removal of the screw 52 releases the spring 47 from engagement with the nut which is then slidably removable from the hub 36. When the two screws 34 are removed, the collar 33 is released from the plate 24 and the screw, the nut and the collar may be removed as a unit from the work carrying mechanism 23 and a new lead screw 32 having a differently pitched thread may be readily substituted therefor. In this manner the indexing of the table or the speed of movement thereof relative to the rotation of the work piece may be quickly adjusted.

For indexing the table 27 relative to the plate 24, I have provided an indexing head 61 having a plurality of notches 62 disposed in predetermined position about its periphery. The number and positioning of the notches vary with the pitch of the lead screw and the pitch of the threads to be cut in the work piece. In Figure 3, I have shown the notches to be two in number which effect the indexing of the table 27 at one half of the pitch of the lead screw 32. The head 61 is provided with a tapered central hole which engages the tapered surface 63 frontwardly on the lead screw 32 on the end of which a thread 64 is provided.

A differentially threaded cap nut 65, that is to say a cap nut having a pair of threads of different pitch, is first screwed on to the indexing head 61 and the nut and plate as a unit are then screwed on to the thread 64 of the lead screw. After the head 61 rests against the tapered shoulder 63 of the screw, the nut 65 is then moved in the opposite or counter-clockwise direction, relative to the head 61, which, due to the differential relation of the threads, causes the tapered portion 63 to be drawn tightly within the central tapered aperture of the head 61 and the two threads of the nut to be in locking relation to the thread of the lead screw 32 and that of the indexing head 61. To release the head from the screw, the nut 65 is turned in a clockwise direction to force the tapered end 63 longitudinally of the head 61 to thereby loosen the head on the screw and the head 61 is screwed as a unit with the nut 65 off of the thread 64.

An arm 66 is pivoted, by a shaft 67, to the base plate 24 having a pin 68 in the end thereof which projects into the plane through the head 61. A spring 69 is wound about the shaft 67, having one end fixed to the arm 66 and the other end abutting against the base plate 24 for the purpose of forcing the arm towards the plate to have the pin 68 thereof engage the outer periphery of the head. A cam 71, pivoted by the pin 72 to the base plate 24, engages an extension 73 of the arm 66 for actuating the pin 68 outwardly from the periphery of the head 61. The shaft 72 extends frontwardly of the cam and is provided with a handle 74 as shown in Figure 6 for the purpose of actuating the arm.

After a cut has been taken across the work piece the arm 74 is moved downwardly to cause the pin 68 to disengage a notch 62 of the indexing head, for the purpose of permitting the head 61 to be turned to advance the work piece a predetermined amount to a point where the pin 68 engages the next succeeding notch. In the construction herein shown, the notches are disposed 180 degrees apart which advances the table a distance equal to one half of the pitch of the lead screw 32.

When the spacing of the serrations of the work piece is to be slightly changed relative to the lead angle of the screw 32, the screw is offset angularly to the normal position of the work piece which is retained relative to the cutter, by moving the base plate 24 relative to the surface 26 of the machine 20 about the pin 25 referred to hereinabove. Work clamping members 75 are provided with slots 76 for the purpose of permitting the members 75 to be disposed in angular relation on the table 27, when the supporting bolts are moved in the slots in the table 27 so as to support the work piece to have the thread thereof parallel to the direction of movement of the cutting element thereacross.

In this construction, a distance advanced by the nut 35 along the lead screw 32, will be equal to the distance in which the work has been advanced relative to the cutting element multiplied by the cosine of the angle which the lead screw 32 has been set off relative to its normal position. In this manner, threads of different pitch from that of the thread of the lead screw may be machined by setting off the work supporting table and lead screw angularly relative to the normal retained position of the work piece, a predetermined amount computable by the above mentioned relation.

To effect a further adjustment for varying the pitch between the threads of the work piece relative to the thread of the lead screw besides that effected by offsetting the lead screw angularly relative to the direction of movement of the work piece, I provide the sloping bar 45 and the arm 44 extending from the nut 35, for the purpose of advancing the nut on the thread as the table moves relative to the base plate 24. It is very apparent that if the nut is advanced on the thread at the same time the thread is turned to advance the nut thereon, the resulting motion to the nut is the sum of the two advancements which are cumulative. The bar may be so constructed as to be tiltable through a small angle to vary its effect throughout the length of the screw which will thereby provide a very fine adjustment for relating the serrations cut, to the screw thread.

When only a very slight change is to be effected between the thread to be cut in the work piece and the tread of the lead screw, the tiltable bar arrangement may be employed alone to effect the very slight difference in pitch. When a greater change is to be effected between the pitches, the tiltable bar is used in combination with the angular displacement of the lead screw, to effect a very fine adjustment between the two pitches after the lead screw 32 has been adjusted.

When my table mechanism is constructed to cut threads in flat work pieces, having pitches which may be greater or less than the pitch of a particular lead screw, I construct the lead screw to index the standard pitch, when the lead screw is disposed medially of its maximum angle of displacement relative to the direction of motion of the work piece. In this construction when a pitch greater than normal is desired, the angular displacement of the lead screw is decreased and if the pitch is to be less than the normal pitch, the angle of displacement is increased.

To protect the ball bearings 29 and the surface of the race 28, from the cutting and abrading particles, which may fall thereon during the cutting operation, I have provided a cover 78 which is attached to the rear end of the table at one end and to a roller 79 at its other end for the purpose of being drawn upwardly and over the ball bearings and the races as the table is moved frontwardly of the base plate. Pulleys 81 are mounted in pivotal relation on the base plate 24 over which a cord or cable 82 extends, one end of which is attached in fixed relation to the table, while the other end is wound about the pulley 83 provided on the end of the roller 79.

As the table 27 is moved forwardly on the base plate 24, the end of the cover 78 attached thereto causes it to be unwound from the roll 79 and to be drawn across the upper surface of the base plate. The unwinding of the roll 79 by the table causes the cord or cable 82 to be wound on the pulley 83 and when the table 27 is moved rearwardly, the cord is drawn therewith over the pulleys 81 to cause the pulley 83 to be turned in a direction to wind up the cover 78. An idling roller 84 is provided on the upper rear portion of the base plate 24 for guiding the movement of the cover.

Referring to Figure 8, I have shown my indexing mechanism with the indexing head 61 removed and a work carrying spindle and driving means therefor substituted for the indexing head, for the purpose of rotating the work piece and for advancing the work piece relative to the cutting tool in accordance with the pitch of the thread of the lead screw. A member 86 is mounted in fixed position on the table and is provided with a yoke 87 on one end and a head 88 on the other end, the latter of which is adjustable relative to the member 86 in a slot 89 whereon it is retained in fixed position by the tightening of a handle 91 on a supporting screw 92.

A spindle 93 of a well known type is carried by the head 88 and a driving spindle 94 is carried by the yoke 87. A centering chuck 95 is provided exteriorly of the yoke on the spindle 94 for the purpose of securing one end of the work piece in fixed relation to the driving spindle. A driving gear 96 is provided in the yoke in slidable engagement with the driving spindle 94.

A driving head 97 is mounted on the end of the lead screw 32 and is driven through a reversible gear train 98 which is supported on the base plate 24. A shaft 99 extends from the gear train 98 and is provided with a plurality of pulleys 101 by means of which the shaft is driven. An oppositely disposed plurality of pulleys 102 are mounted in alignment with the pulleys 101 on a shaft 103 on which a gear wheel 104 is mounted in fixed relation. A worm 105 engages the worm wheel 104 and is driven by a shaft 106 of a motor 107, all of which is mounted in fixed relation to the base plate 24. A suitable belt 108 is provided to interconnect the pulleys 101 and 102, which is movable into engagement with any one of a plurality of sets thereof for the purpose of changing the speed of rotation of the shaft 99 for driving the gear train 98.

The gear train has been shown in sections in Figures 9 and 10, for illustrating the relation of the gears when in driving and in reversing relation. The shaft 99 is provided with a worm 109, within the casing 111 for the gears, and engages a worm wheel 112 for the purpose of rotating it in a clockwise direction. A shaft 113, fixed to the worm wheel 112, is journaled in the bosses 114 of the gear casing 11, and has gears 115 and 116 mounted in fixed relation thereon. When the worm wheel 112 is driven in a clockwise direction by the worm 109, the gears 115 and 116 are likewise rotated in a clockwise direction. Referring to Figure 9, which is a section through the casing 111 frontwardly of the gear 116, the gear is shown as being in mesh with a gear 117 which is rotatably mounted on a shaft 119. The shaft is provided with a driving member 121 exteriorly of the housing 111 for engaging the driving head 97.

In Figure 10, I have shown a section through the casing 111 frontwardly of the gear 115, wherein the gear 115 is shown in mesh with an idling gear 123 mounted on a stub shaft 124 which is supported on the side of the casing 111 by the nut 125. The idling gear 123 meshes with a gear 126 which is mounted on the shaft 119 in such manner as to be rotated relative thereto. In this construction, when the worm 109 is revolved, the worm wheel 112 is rotated, which in turn rotates the gears 115 and 116, in a clockwise direction. The gear 116 rotating the gear 117 relative to the shaft 119 in a counterclockwise direction and the gear 115, operating through the gear 123, actuates the gear 126 in a clockwise direction.

Each of the gears 117 and 126 are provided on their adjacent sides with ratchet teeth 127 and 128, respectively, having the ratchet faces thereof disposed in opposite directions to each other. A ratchet member 130 is provided medially of the ratchet teeth 127 and 128 and is spaced slightly therefrom out of engagement therewith and is keyed to the shaft 119 for rotational and longitudinal movement. A slot 131 is provided in the central body portion of the ratchet member 130, in which a camming end 132 of a shaft 133 registers to be actuated by a handle 134.

When the handle is moved downwardly the cam 132, operating in the slot 131, forces the ratchet member 130 into engagement with the ratchet teeth 127 of the gear 117. When the handle is moved in an upwardly direction, the ratchet member 130 is released from the ratchet teeth 127 and is moved into engagement with the ratchet teeth 128 of the gear 126. The medial position of the handle disconnects the gears entirely from the driving member 121. The engagement of the teeth 127 and 128 with the ratchet member 130 effects a driving connection between the gears 117 or 128 with the driving shaft 99. When the ratchet member 130 is connected to the teeth 127 of the gear 117 the driving head 97 is rotated in a counterclockwise direction and when the ratchet member 130 engages the ratchet teeth 128 of the gear 126, the driving head 97 is operated in a clockwise direction. In this manner the handle 131 controls the movement of the work supporting table 27 to have it move in a frontward or a rearward direction.

The driving head 97 is provided with a gear 136 which meshes with the gear 96 for driving the spindle 94. A bifurcated member 137 spans the gear 96 and is attached to the base plate 24. The member 137 retaining the gear 96 in mesh with the driving gear 136 as the spindle 94 moves longitudinally through the gear as the table is moved by the lead screw 32. In this manner, the work is rotated as the table is drawn across the face of the cutting tool, by the driving head 97 which operates the lead screw 32 to advance the table at the same time as it rotates the work piece relative to the cutting tool. It has been pointed out above how the back lash, between the driving head 97 and the table, is eliminated from the lead screw, its driving nut and supporting collar, in order that the table may be moved in either direction and be retained in predetermined relation to the lead screw.

It will be very apparent that a similar back lash eliminating or compensating device is required between the driving head 97 and the spindle 94 in order to take up or eliminate any lost motion which may be present between the gear teeth, and the connection of the gear 96 on the spindle 94. In my present construction, I have provided a compensating arrangement for eliminating the effects of any lost motion or back lash in the rotating portion of my machine, which is incorporated in the driving head 97 and which will now be described in detail.

The driving head is shown enlarged in Figures 11 to 14 inclusive, as comprising a cylindrical member 140 having a flange 141 on one end and having threads 142 on the other end on which a washer 143 is screwed and retained in fixed spaced relation on the member 140 relative to the flange 141. Between the flange 141 and the washer 143 a second washer 144 is provided, along with the gear 136, both of which are mounted for rotational movement on the outer surface of the cylindrical member 140. Two driving pins 145 are mounted in fixed relation to the gear 136 and extend either side thereof, the portion extending frontwardly of the washer 143 engaging the driving member 121 provided on the end of the shaft 119.

The other end of the pins 145 extends through slots 146 provided in the threaded washer 143 to permit relative movement of the pin with respect to the washer. Similar slots are provided in the washer 144 and the flange 141 for the purpose of permitting the movement of the inner end of the pin 145 therein. The sides of the pin are flattened as at 147 for the purpose of engaging the flat surfaces 148 provided in the ends of the slots 146 of the washer 144 and the flange 141.

In this construction it will be noted that the gear 136 is movable relative to the washers 143 and 144 and the flange 141 an amount equal to the length of the slot 146. It will thus be seen that when the driving member 121 is first rotated the motion is transferred to the pins 145 to rotate the gear 136 before the flat surfaces 147 of the pins engage the flat surfaces 148 of the slots 146 to cause the rotation of the cylindrical member 140. Since the cylindrical member 140 is attached, by a threaded flanged member 149 in fixed relation on the end of the shaft 32, by the differential nut 64, the shaft will not be rotated until the gear has been moved a predetermined amount.

In a similar manner, after the table 27 has been moved to its rearward-most position, the reversing of the gear train 98 causes the gear 136 to be moved backward until the pins 145 engage the opposite end of the slot 146 before the shaft 32 is rotated therewith. In this construction any play in the gear teeth or between the gear 96 and the spindles 94 will be taken up by the initial movement of the gear 136 before the shaft 32 is driven.

In order to regulate the amount of movement of the gear 136 relative to the movement of the shaft 32, I have provided a pin 151 which is screwed in the plate 144 and extends within a slot 152 in the flange 141, to regulate the angular movement of the washer 144 relative to the flange 141. When the flanges are thus moved relative to each other the slots 146 therein are also moved to decrease the relative opening therebetween in which the pins 145 are movable. In this manner the plates may be rotated a sufficient amount to have the opposite sides of the respective slots tightly clamp the pins 145 relative to the plates and therefore to the cylindrical portion 140 and the driving of the gear 136 and the shaft 32 will then be direct.

For the purpose of adjustment, I have provided a pair of threaded holes 153 and 154 in which screws 155 and 156, respectively are provided. A spring 157 is employed between the screw 156 and the pin 151 for effecting a bias to the pin 151 relative to the slot in order that the adjustment of the screw 155 may readily be made to force the pin 151 against the spring. By this means, the play existing between the lead screw 32 and the work piece may be compensated for, to have the relative play taken up between the rotation of the work piece and the longitudinal movement of the table, each time the table is reciprocated.

It is to be understood that in case the play should appear to be greater between the connection to the lead screw 32 than that to the work piece, that the mounting of the pins 145 may be reversed, that is to say that the pins may be fixed relative to the cylindrical member 140 to operate in slots provided in the gear 136, in which construction the lead screw 32 will be moved to take up the relative play thereof before the gear 136 is rotated.

To eliminate the play from between the gear 96 and the spindle 94, I have provided a sleeve 159 which is slidable on the spindle 94 and which is keyed to the gear 96 by the key 161. A pair of tapered slots 162 are provided in diametrically opposite relation in the sleeve 159, in which a pair of tapered keys 163 are mounted, having tapered key portions 164 which engage keyways 165 provided longitudinally of the shaft. A pair of set screws 166 mounted in a ring 169 are employed for adjusting the members 163 relative to the tapered slot 162 of the sleeve. By having the keys thus adjustable relative to the keyways, they may engage the key-ways 165 in such manner that the gear is retained in slidable relation to the shaft, to be rotated therewith, with substantially no play present between the two members.

In Figure 17 I have shown the nut 65 provided with threads 167 and 168 which are of different pitch and which lock the flanged bushing 149 on the tapered end of the lead screw 32 in a manner similar to that pointed out above in relation to the supporting of the indexing head 61 thereon.

It will thus be seen that I have provided an indexing table for adjusting a work piece relative to a cutting tool and which may be adjusted so as to have the work piece indexed relative to the lead screw in such manner that the resulting thread provided in the work piece is of a different pitch from that of the screw. The lead screw is mounted in such manner on my table that it is readily removable for the purpose of changing the lead screw and therefore the indexing of the table. By providing means for retaining the lead screw in predetermined relation to the driving nut and the supporting collar, the back lash, heretofore present between the base plate and the table is entirely removed.

I have provided a driving mechanism for the table and work piece which may be attached to the lead screw in fixed relation with the base plate when the indexing head thereof has been removed. A compensating driving head is provided on the end of the lead screw which takes up the play from between the rotation of the work and the longitudinal movement of the table each time the table is reciprocated. The compensating means is adjustable so that the amount of play compensated for can be regulated in accordance with the amount of play which may exist between the various machines.

I employ a differentially threaded nut for the purpose of drawing the tapered shoulder of the lead screw into firm relation to the indexing or the driving head for the screw, which draws the tapered end in firm relation with the tapered hold in the head, by a counter-clockwise movement of the nut relative to the head. By turning the screw in a clockwise direction relative to the head, the head is forced away from the tapered end of the lead screw.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. The method of varying the indexing of a work piece relative to the angle of lead of an indexing screw which includes the angular disposition of the screw relative to the normal retained position of the work piece.

2. The method of varying the indexing of a work piece relative to the angle of lead of an indexing screw which includes, the angular disposition of the screw relative to the normal retained position of the work piece, the variation effected occurring as the cosine of the angle so set off.

3. The method of varying the indexing of a work piece relative to the angle of lead of an indexing screw which includes, the angular disposition of the screw relative to the normal retained position of the work piece, the variation effected occurring as the cosine of the angle so set off, and progressively varying the screw engaging means during its movement for effecting a minute adjustment of the indexing.

4. The method of varying the indexing of a work piece relative to the angle of lead of an indexing screw which includes, the angular disposition of the screw relative to the normal retained position of the work piece, and progressively varying the screw engaging means during its movement for effecting a minute adjustment of the indexing.

5. The combination with a base plate for supporting a lead screw and a driving element for actuating a work supporting table, of an indexing means for said screw for regulating the movement of the table, means for mounting said base plate on a machine normal to a cutting element for angular adjustment relative thereto, means for supporting a work piece on said table relative to the angle adjusted, and a sloping bar associated with said driven element of said screw for effecting a minute adjustment of the indexing of the work piece.

HENRY QUINTIN MUNN.